(12) United States Patent
Bibollet (10) Patent No.: US 6,283,254 B1
(45) Date of Patent: Sep. 4, 2001

(54) BRAKING DEVICE FOR A MOTORIZED SNOW VEHICLE

(76) Inventor: Jean-Claude Bibollet, Le Glapigny, BP 1, F- 74 230 Thones (FR)

( * ) Notice: Subject to any disclaimer, the term of this patent is extended or adjusted under 35 U.S.C. 154(b) by 0 days.

(21) Appl. No.: 09/416,419

(22) Filed: Oct. 12, 1999

(30) Foreign Application Priority Data

Oct. 16, 1998 (FR) .................................................. 98 13166

(51) Int. Cl.⁷ .............................. B62B 17/08; B60T 1/14
(52) U.S. Cl. ............................ 188/8; 188/5; 188/6; 188/7
(58) Field of Search ..................................... 188/5, 6, 7, 8

(56) References Cited

U.S. PATENT DOCUMENTS

| | | | |
|---|---|---|---|
| 3,104,116 | * | 9/1963 | Knight . |
| 3,682,495 | * | 8/1972 | Zaimi ................................. 280/12.14 |
| 3,957,131 | * | 5/1976 | Perkins ................................... 180/99 |
| 4,768,794 | * | 9/1988 | Bibollet .............................. 280/21 R |
| 5,203,424 | * | 4/1993 | Gogo .................................... 180/190 |
| 5,642,788 | * | 7/1997 | Mabbott ............................... 180/272 |
| 5,673,722 | * | 10/1997 | Martin ..................................... 188/6 |
| 5,865,445 | * | 2/1999 | Svensson ............................ 280/11.2 |
| 5,931,481 | * | 8/1999 | Hoffman ........................... 280/28.11 |
| 6,062,650 | * | 5/2000 | Smith .................................... 299/1.4 |

FOREIGN PATENT DOCUMENTS

403186464 * 8/1991 (JP) .

* cited by examiner

*Primary Examiner*—J. J. Swann
*Assistant Examiner*—David Divine
(74) *Attorney, Agent, or Firm*—Oliff & Berridge PLC (57) ABSTRACT

A braking device for a motorized snow vehicle having a front steering assembly with at least one steering column secured to at least one ski, and articulated in rotation around a spindle. The motorized snow vehicle further has a rear support assembly, equipped with at least one driving caterpillar track. The front steering assembly comprises at least one mobile braking element operated, by control means, between a retracted rest position inside a cavity of the ski, and an active braking position protruding out under the general sliding surface of the ski in a middle zone situated appreciably at the level of the articulation spindle between the steering column and the ski.

20 Claims, 11 Drawing Sheets

BRAKING DEVICE FOR A MOTORIZED SNOW VEHICLE

BACKGROUND OF THE INVENTION

The present invention relates to a braking device for a snow vehicle in particular of the snowbike type, comprising:

a front steering assembly comprising at least one steering column secured to at least one ski, and articulated in rotation around a spindle, and a rear support assembly, equipped with at least one driving caterpillar track.

STATE OF THE TECHNIQUE

At the present time, braking devices of this type of vehicle act on the driving caterpillar track. Although they can slow down and even stop rotation of this track, they prove insufficient to brake the vehicle efficiently on downhill stretches where the caterpillar track is no longer bearing the load, due to its rear position, the weight being transferred due to the slope mainly onto the front of the vehicle, and in particular onto the steering ski or skis of the vehicle.

OBJECT OF THE INVENTION

The object of the device according to the invention is therefore to fit an efficient brake on a motorized snow vehicle.

According to the invention, the front steering assembly comprises at least one mobile braking element, operated by control means between a rest position at least partly retracted inside a cavity of the ski, and an active braking position in which said element protrudes out under the sliding surface of the ski in a middle zone situated appreciably at the level of the articulation spindle between the steering column and the ski.

According to one feature of the invention, the braking element is movable in sliding either with respect to the ski, or with respect to the steering column, said sliding taking place obliquely with respect to the ski according to an axis extending from the front and top to the rear and bottom of the ski, or according to an axis extending from the rear and top to the front and bottom of the ski.

According to another feature of the invention, the braking element is movable in rotation with respect to a transverse spindle extending perpendicularly with respect to the longitudinal plane of symmetry of the ski, movement of the braking element in rotation from the active position to the rest position taking place upwards with respect to the bottom surface of the ski. The braking element comprises a brake shoe formed by at least one gripping blade designed to achieve a progressive braking effect according to the depth of penetration in the snow.

The brake shoe in the retracted rest position can be either outside the body of the ski, or in a rest cavity situated inside the body of the ski, or in a window passing over the whole thickness of the ski.

According to a preferred embodiment, the brake shoe in the form of a jaw comprises two lateral notched blades appreciably parallel to the longitudinal plane of symmetry, and a transverse notched blade joining the lateral blades at their rear end.

The control means comprise for example an electrical actuator controlled by a contactor and operating in conjunction with two end-of-travel contacts enabling the power supply of the actuator to be cut off in said extreme active and rest positions. The control means can also comprise a hydraulic or pneumatic jack.

These different control means can be integrated in a housing of the ski or in the steering column.

According to a particular arrangement, the rotation spindle of the braking element is coaxial with the articulation spindle of the steering column. The control means comprise a drive motor device operating in conjunction with transmission means coupled with the braking element. The transmission means can be formed by a couple of conical cogs, or a complete cogwheel, or by a circular sector of cogwheel actuated by an endless screw extending perpendicularly with respect to the rotation spindle of the braking element.

According to a development of the invention, the bottom edge of each braking element comprises a first front part with a toothless edge acting as a blade, and a second rear notched part whose teeth are set back in the vertical direction with respect to the edge, so as to be situated above the snow in the non-braking position.

BRIEF DESCRIPTION OF THE DRAWINGS

Other advantages and features will become more clearly apparent from the following description of an embodiment of the invention, given as a non-restrictive example only and represented in the accompanying drawings in which.

DETAILED DESCRIPTION OF DIFFERENT EMBODIMENTS

Figure 1:
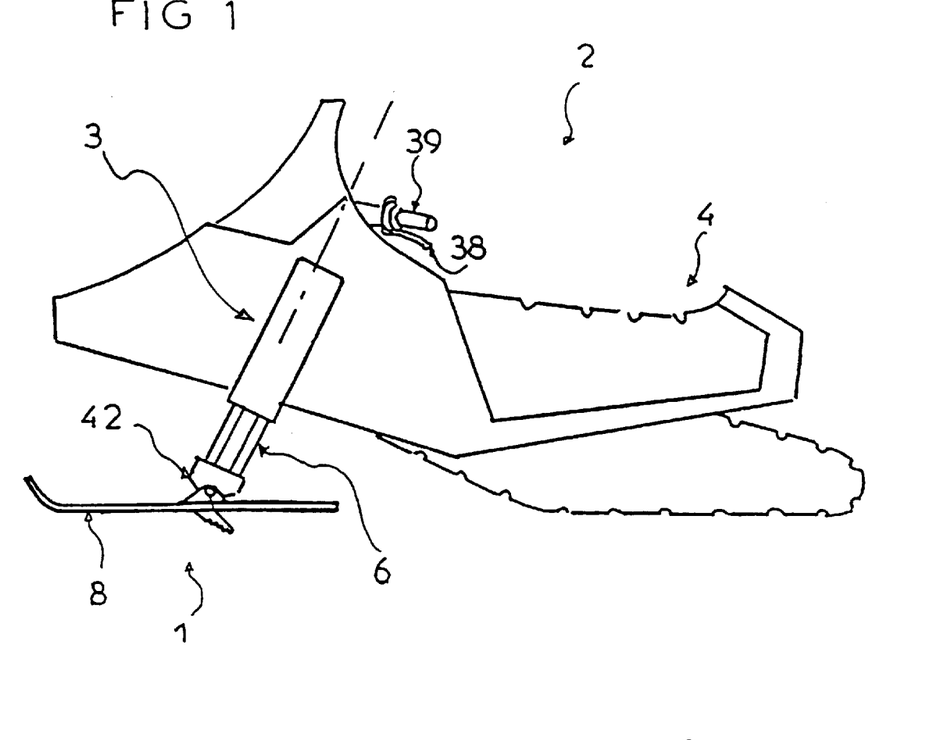
FIGS. 1 and 2 represent two types of snow vehicles respectively comprising one or two skis on which the braking device can be fitted.
Figure 2:
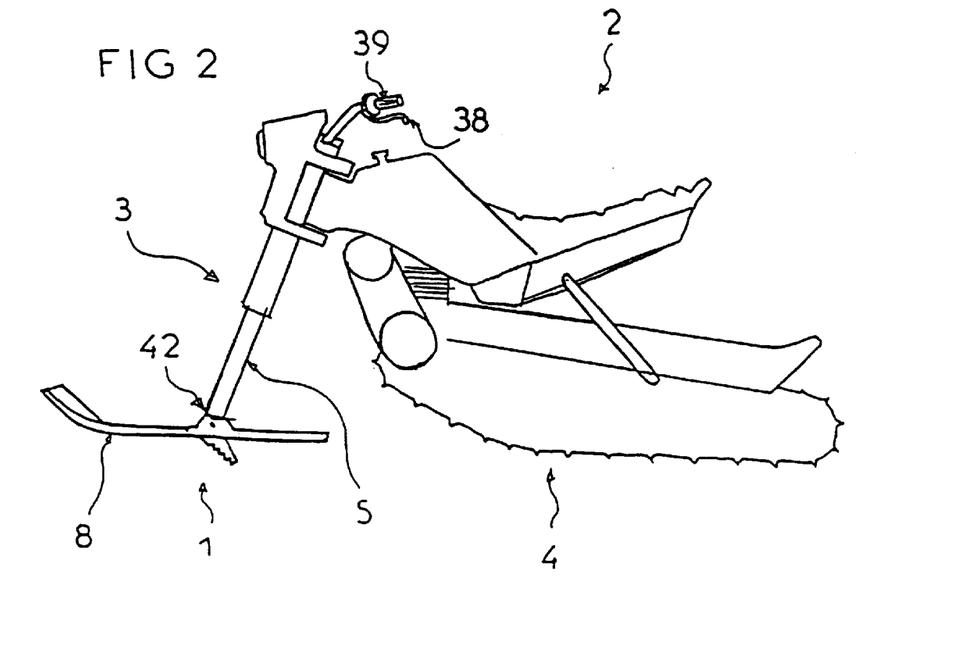

In FIGS. 1 to 8, the braking device 1 is designed to be fitted on snow vehicles 2 of the type constituted by a rear support assembly 4 on which a front steering assembly 3 is articulated. The front steering assembly 3 comprises at its top end handlebars 39 and at its bottom end a ski 8 articulated in rotation around a transverse spindle 42 on the steering column 5 as illustrated in FIG. 2, or two skis 8 articulated on two steering arms 6 of a fork as illustrated in FIG. 1.

The braking device 1 designed to be fitted on the ski(s) 8 articulated on a steering column 5 of a front steering assembly 3 of a snow vehicle 2 is formed by an actuating device 7 soliciting control means 9 designed to actuate a mobile braking element 10, said mobile element 10 moving between a rest position in which it is retracted with respect to the sliding surface 11 of the ski 8, and an active position where it protrudes partly out from said sliding surface 11. Said protruding active position is advantageously obtained in a middle zone 41 of the ski 8 situated appreciably at the level of the articulation 42, between the steering column 5 and the ski 8.

By steering column 5 we also mean the steering arms 6 of a vehicle of the type illustrated in FIG. 1 having two skis.

Figure 3:
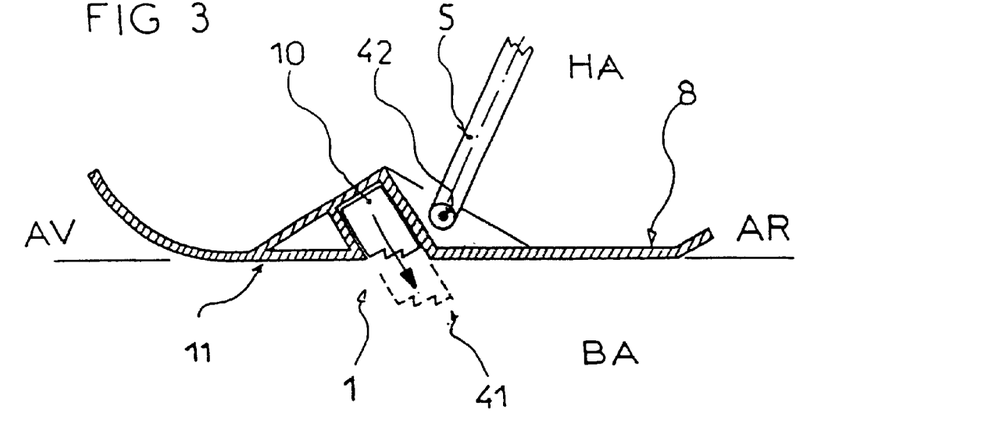
FIGS. 3, 4 and 5 relate to three possible alternative versions of a first embodiment of the device with a brake shoe movable in translation.
Figure 4:
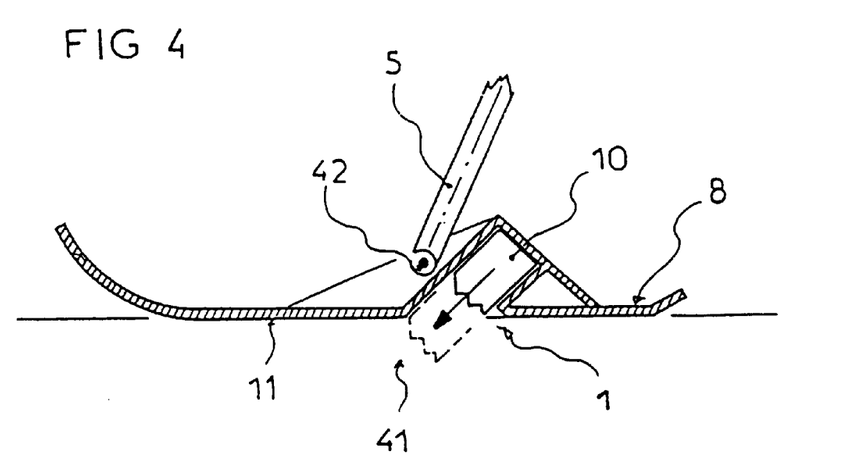
Figure 5:
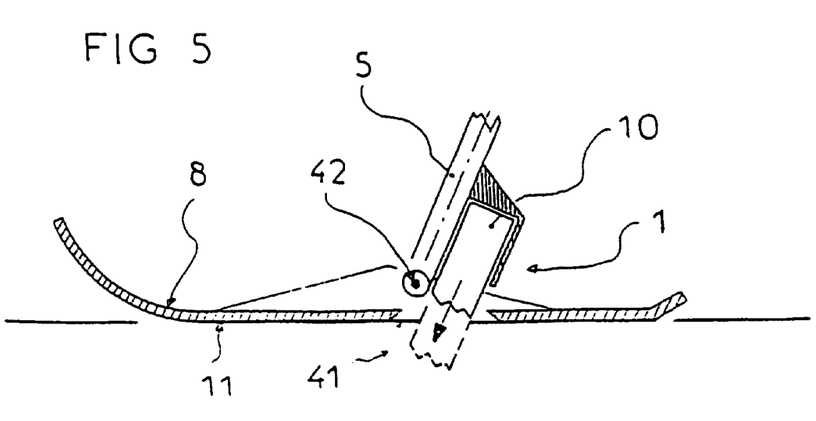

According to a first embodiment, the mobile braking element 10 is movable in translation with respect to the ski 8, or with respect to the steering column 5 as illustrated in FIGS. 3, 4 and 5; it can protrude out to the rear and the bottom of the ski 8, as in the first alternative embodiment illustrated in FIG. 3, or to the front and the bottom, as in the second alternative embodiment illustrated in FIG. 4.

According to a third alternative embodiment illustrated in FIG. 5, the mobile braking element 10 is movable in translation with respect to the steering column 5 on which the ski 8 is articulated in rotation, which provides the advantage of accentuating or on the contrary of minimizing the braking effect automatically according to the angle of incline of the ski with respect to the steering column. When the vehicle goes over a mogul, the braking effect is accentuated with the downward incline of the ski. The braking effect is on the contrary decreased when the front of the ski lifts up, for example when going through a hollow, without having to act on the control means of the brake.

Figure 6:
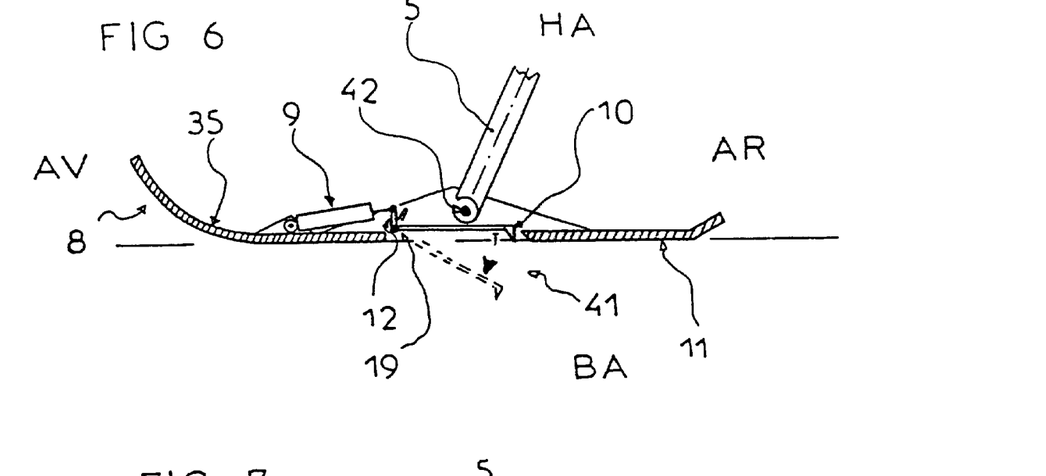
FIGS. 6, 7 and 8 represent three alternative versions of a second embodiment according to which the brake shoe is movable in pivoting.
Figure 7:
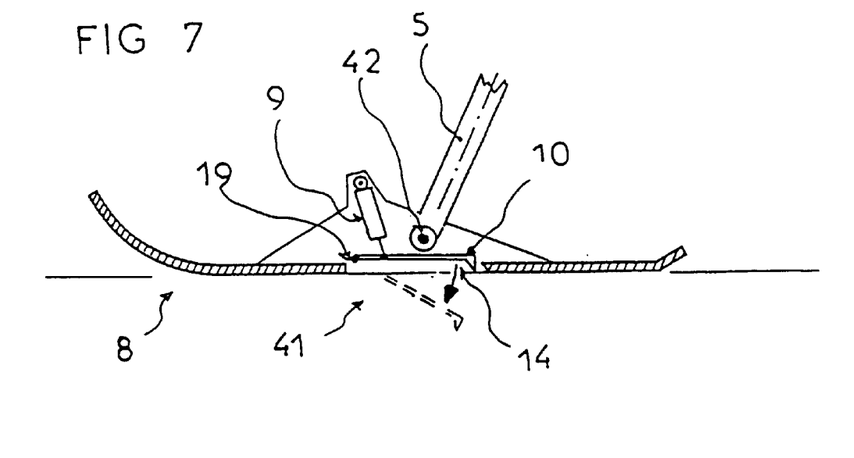
Figure 8:
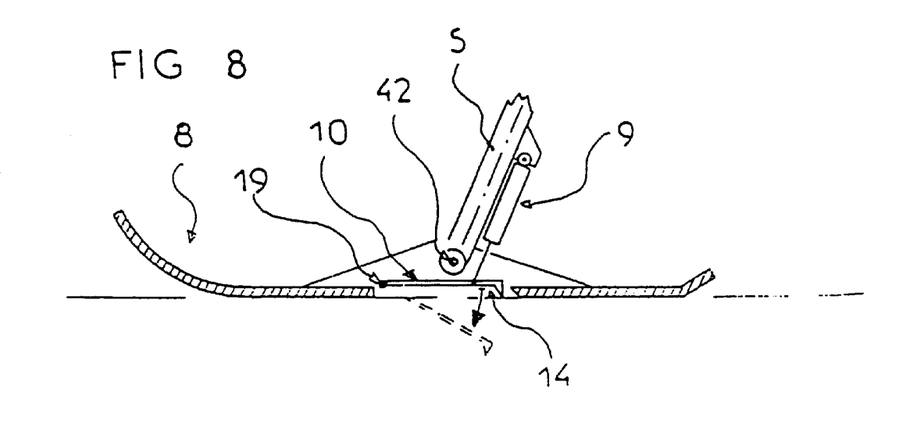

According to a second embodiment, the mobile braking element 10 is articulated in rotation around a rotation spindle 19 appreciably transverse with respect to the ski 8 as illustrated in FIGS. 6, 7 and 8. In a first alternative version, the control means 9 enabling rotation of the mobile braking element 10 to be achieved are positioned on the front part (AV) of the ski 8 and act on a lever arm 12 of the mobile braking element 10, as shown in FIG. 6. According to a second alternative version, the control means 9 securely united to the ski 8 act directly on the mobile braking element 10, as illustrated in FIG. 7. According to a third alternative version illustrated in FIG. 8, the control means 9 are securely united to the steering column 5, which provides the same advantage of accentuating or on the contrary of minimizing the braking effect automatically according to the angle of incline of the ski with respect to the steering column 5.

Figure 9:
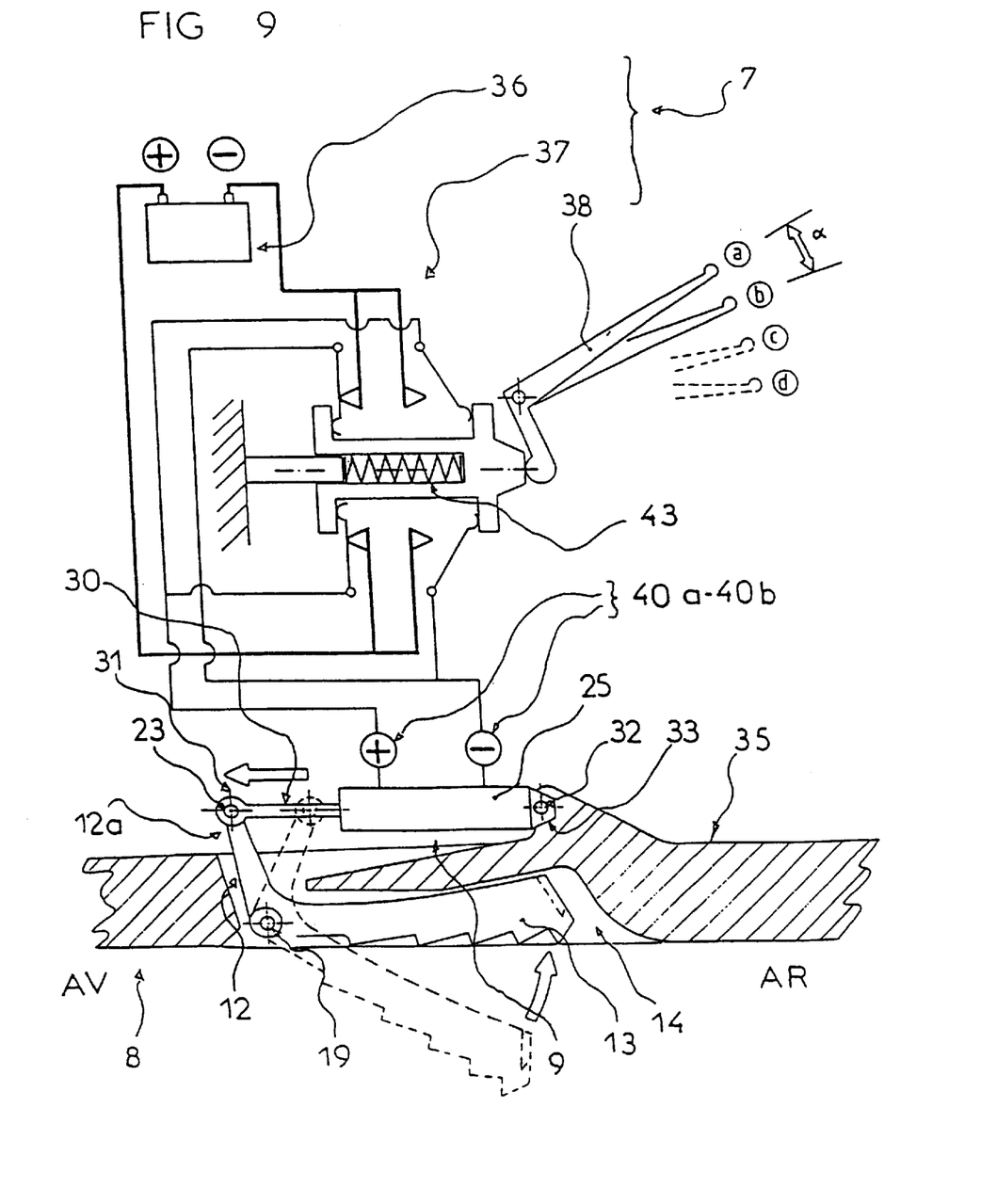
FIGS. 9, 10 and 11 represent a preferred embodiment of the invention, the complete braking device being respectively in the rest position, in the active position and in an intermediate position.
Figure 10:
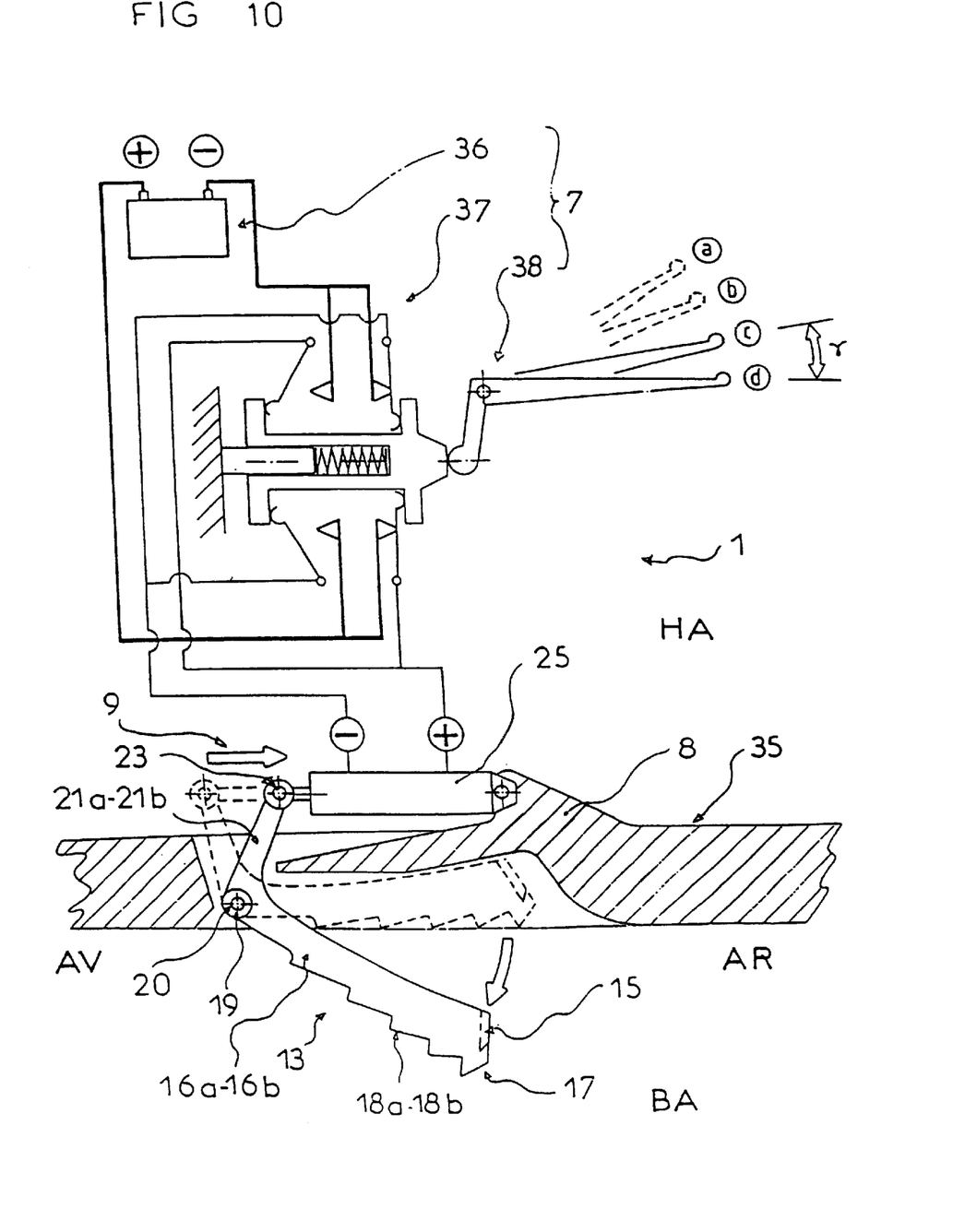
Figure 11:
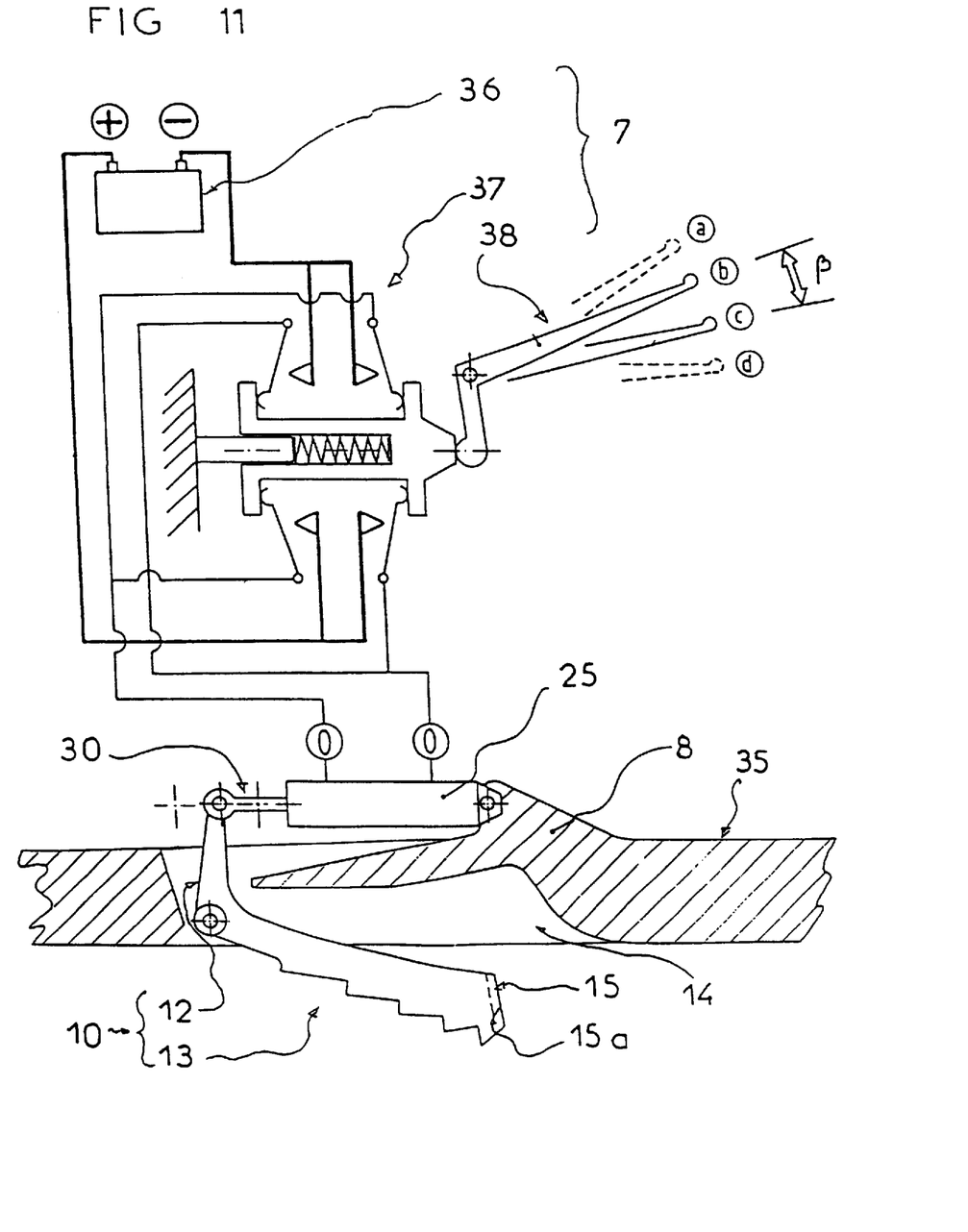

With reference to FIGS. 9 to 11, the mobile braking element 10 formed by a lever arm 12 and a brake shoe 13 is articulated in rotation on a transverse spindle 19 of the ski 8, and the control means 9 are situated at the rear (AR) of the transverse spindle 19. The control means can cause rotation of the top end 12a of the lever arm 12 of the mobile braking element 10 thus causing rotation of the brake shoe 13 of the mobile braking element 10.

The mobile braking element 10 is thus movable between a rest position in which it is retracted inside a rest cavity 14 of the ski 8 matching the shape of the brake shoe 13 situated inside and above the sliding surface 11, and an active braking position where a part of the brake shoe 13 protrudes out from the sliding surface 11, so as to penetrate more or less deeply into the snow to exert a braking action.

In this preferred embodiment of the invention, the brake shoe 13 has the form of a bracket composed of two lateral blades 16a, 16b appreciably parallel to the longitudinal plane of symmetry of the ski, and a transverse blade 15 situated at the rear end 17 of the shoe 13, said lateral blades 16a, 16b and transverse blade 15 having notched bottom edges 15a, 18a, 18b. The lateral blades are slightly curved upwards HA and the bottom edge 15a of the transverse blade 15 slightly retracted upwards with respect to the notched bottom edges 18a, 18b of said lateral blades 16a, 16b so that when braking takes place, the lateral blades 16a, 16b protrude out from the sliding surface 11 before the transverse blade 15 also protrudes out Thus, when short braking takes place, only the lateral blades 16a, 16b are protruding and when a slightly longer braking takes place, the transverse blade 15 also protrudes out, so as to increase the braking force of the device 1. According to an alternative execution, said transverse blade 15 when it portrudes partly out, is contained in a plane extending from the bottom and the front to the top and the rear, the acute angle it forms with the vertical being maximum when the braking element 10 is in the active braking position.

At its front end, said brake shoe 13 is equipped with a transverse rotation spindle 19 able to pivot inside a hole 20 made in the body of the ski 8. The lateral blades 16a, 16b of the shoe 13 are extended by two side walls 21a, 21b, extending appreciably upwards (HA), and bearing at their top ends a transverse operating spindle 23. The side walls 21a, 21b and operating spindle 23 constitute the lever arm 12 of the mobile braking element 10.

It is possible, without departing from the scope of the invention, to achieve a mobile braking element 10 whose lever is a short rod securely affixed to the transverse rotation spindle 19 or to use a spindle securely affixed to the body of the ski and a shoe 13 pivoting around the spindle. Likewise, said shoe 13 may not have a transverse blade 15 at its rear end, and pivot so that the lateral blades 16a, 16b are stowed alongside the side walls 24a, 24b of the body of the ski 8 when the mobile braking element 10 is in the rest position. The shoe 13 can also be formed by a single lateral blade, notched for example, or any other profile shape of the single lateral blade and two oblique blades type forming a Y-shaped, T-shaped, or U-shaped profile, or two blades arranged in a V-shape.

The control means 9 of the braking element 10 are for example formed by an electrical actuator 25 comprising a stator 26, and a rotor 27 causing rotation of a threaded rod 28 resulting in translation of the piston 30 of the actuator 25. The piston 30 is coupled to the operating spindle 23 of the lever arm 12 of the braking element 10. The actuator 25 is mounted longitudinally via its rear end 33 on a positioning spindle 32 securely united to the ski 8, allowing it a slight angular movement in the longitudinal plane of symmetry.

Figure 12:
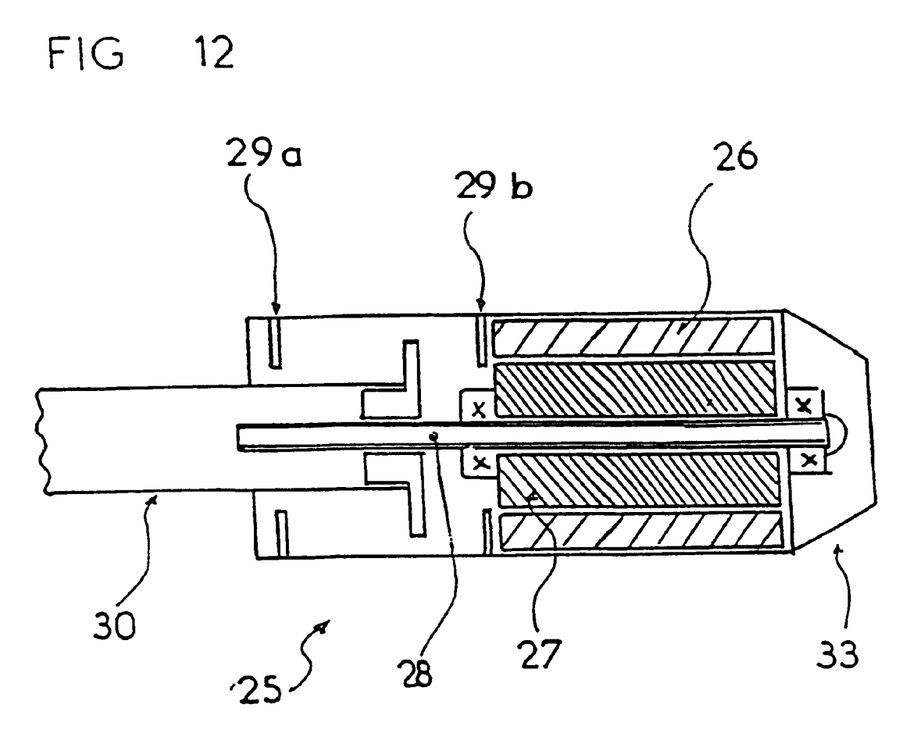
FIG. 12 represents a longitudinal sectional view of the electrical actuator of FIG. 9.
Figure 13:
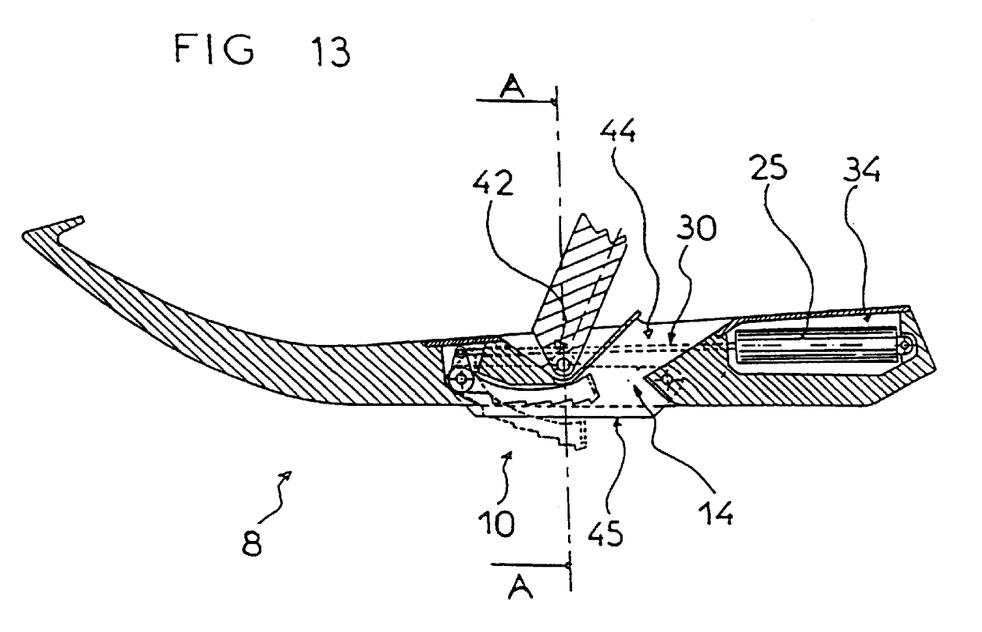
FIG. 13 shows an alternative version of execution where the actuator is integrated in a housing of the ski and where the snow dragged off by the brake shoe is removed via a window passing right through the thickness of the ski.

The actuator 25 can be positioned either in a housing 34 of the ski 8 provided for this purpose, as illustrated in FIG. 13, or on the upper face 35 of the ski, as illustrated in FIGS. 9, 10 and 11. In addition the actuator 25 has two end-of-travel contacts, 29a, 29b in FIG. 12, enabling the electrical power supply of the actuator 25 to be cut off automatically when its piston 30 is respectively in the rest position or in the extreme active position. A new solicitation of the actuator 25 is made possible by inverting the polarity of its power supply. The extreme active position corresponds to the maximum penetration position of the piston 30 in the actuator 25 and therefore to the extreme active position of the mobile braking element 10 as illustrated in FIG. 10, and the rest position corresponds to the maximum withdrawal position of the piston 30 which, due to the rotation of the mobile element around the spindle 19, corresponds to the rest position of the braking shoe 13, which is retracted into the rest cavity 14 of the ski 8, as illustrated in FIG. 9.

According to several alternative embodiments of the invention, mechanical systems of the type with rods, cables, cams, notched belts or pinions, for example, or pneumatic or hydraulic jacks, or even other actuators, can be used as control means 9.

The control means 9 are designed to be operated by an actuating device 7 operated by the user of said snow vehicle 2.

In the case of an electrical actuator 25 securedly united to the ski 8 and the operating spindle 23 of the mobile braking element 10, the actuating device 7 is constituted by an electrical power source 36 supplying the actuator 25 via a contact box 37, controlled by a lever 38 situated on the handlebars 39 of the vehicle 2. The contact box 37 can take three contact positions:
- a closed neutral position A in which it lets the electrical current flow from the power source 36 to the actuator 25 with a polarity enabling the piston 30 to be actuated outwards to its rest position;
- an intermediate position B called open where it does not let the current flow to the actuator 25;
- a closed active position C in which it lets the current flow reversing the polarities at the output terminals 40a, 40b of the actuating device 7, so that the piston 30 of the actuator 25 is then moved to its active position.

Thus the lever 38 controlling said contact box 37 can move in three different zones α, β and γ, corresponding respectively to the positions A, B and C of the box 37, and bounded by four positions characteristic of the angular travel it can cover:
- a position "a" called "rest position" in which the lever 38 is automatically returned by a flexible return system 43 when the user is not acting on the lever;
- a position "d" called "extreme working position";
- two intermediate positions "b" and "c" as shown in FIGS. 9, 10 and 11.

Between the positions a and b, the lever 38 is in zone α and the contact box 37 in position A, as illustrated in FIG. 9; the actuator 25 is therefore urged towards its rest position until it reaches this position, or said lever 38 changes zone. When said rest position is reached, an end-of-travel contact 29a cuts off the electrical power supply to the terminals of the actuator 25 which can then only be actuated by an electrical current of reverse polarity corresponding to the position C of the contact box 37 and a position of the lever 38 in zone γ.

Between the positions b and c, the lever 38 is situated in zone β and the contact box 37 in position B, as illustrated in FIG. 11. The electrical power supply of the actuator 25 is cut off, so that the latter remains in the previously acquired position and consequently maintains the brake shoe 13 in the corresponding position.

Between the positions c and d, the lever 38 is situated in zone γ and the contact box 37 in position C, as illustrated in FIG. 10. The actuator 25 is therefore urged to its active position until it reaches this position, or the lever 38 changes zone. When the extreme active position is reached, the second end-of-travel contact 29b cuts off the power supply of the actuator 25, which can then only be actuated by an electrical current of reverse polarity corresponding to the position A of the contact box 37 and a position of the lever 38 in zone α.

It is moreover possible, without departing from the scope of the invention, to replace the lever 38, for example by a pedal or a pushbutton actuated by foot, or a rotating grip handle situated on the handlebars.

Furthermore, in the case where the snow vehicle 2 is pulling a sledge, this sledge can be equipped with at least one mobile braking element able to protrude out from the sliding surface of the sledge. The mobile braking element is actuated by control means fitted on the sledge, similar to those of the vehicle, said sledge control means being advantageously able to be operated by the actuating device 7 of the braking device 1 of the snow vehicle 2 pulling said sledge.

According to a possible alternative embodiment of the invention, the control means 9 are formed by an electrical actuator 25 reversible on load, return of which to the rest position is achieved by mechanical solicitation due to the thrust of the snow on the braking element 10, and to return springs when the lever 38 of the actuating device is situated in zone α. An electromagnetic brake is powered on by the contact box 37 when the lever 38 is in zone β, so as to block the actuator in the acquired position, and when the lever 38 is situated in zone γ, the actuator is supplied so as to move the braking element 10 to the extreme active position.

The control means 9 can be constituted by an increment system formed by several electromagnets mounted in series, or with proportional action electro-magnets, or electric motors with angular encoders whose working positions will be in direct correlation with the positions occupied by the lever 38. The position "a" of the lever 38 corresponds to the rest position of the brake shoe 13, the position "d" of the lever 38 then corresponds to the active maximum protrusion position of the brake shoe 13, whereas the positions "b" and "c" of the lever 38 correspond to proportional intermediate positions of the brake shoe 13.

Figure 14:
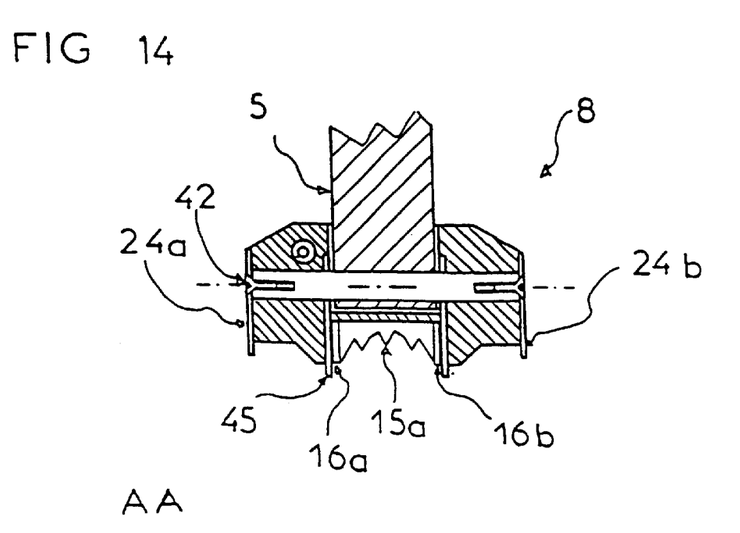
FIG. 14 represents a cross-sectional view along the line AA of FIG. 13.

Moreover, to perform removal of the snow dragged of by the brake shoe 13 when the latter is used, a window 44 (FIG. 13) is arranged through the ski 8. Fixed blades 45, 46 are shaped as longitudinal guide knife-blades on hard snow, and in addition reinforce the solidity in the central zone of the ski 8, which is weakened by the decreased cross-section due to the opening of the window 44 and of the rest cavity 14, as illustrated in FIGS. 13 and 14.

Opening of the ignition circuit of the motor of the snow vehicle 2 automatically causes the braking element 10 to be moved to the maximum active position, whereas closing of the ignition circuit causes the braking element to be returned to the inactive non-braking position. Opening and closing of the ignition circuit are performed by means of a key-operated or safety contactor.

According to an alternative embodiment, to enable optimum reactivity and finer dosing of the braking, the contact box 37 operates in conjunction with an electronic or electrical circuit designed to vary the supply current of the motor of the actuator 25. The speed of actuation can therefore be modulated, and is notably decreasing the further the lever 38 moves away from the position "a" towards the position "b", and then becomes zero when the lever 38 is situated between the positions "b" and "c". The speed increases when the lever 38 moves away from the position "c" towards the position "d". The same applies for movement of the lever 38 in the opposite direction, the speed of actuation decreasing when the lever 38 moves away from the position "d" towards the position "c", and then becomes zero when the lever 38 is situated between the positions "c" and "d", and increases when the lever 38 moves away from the position "b" towards the position "a".

Figure 15:
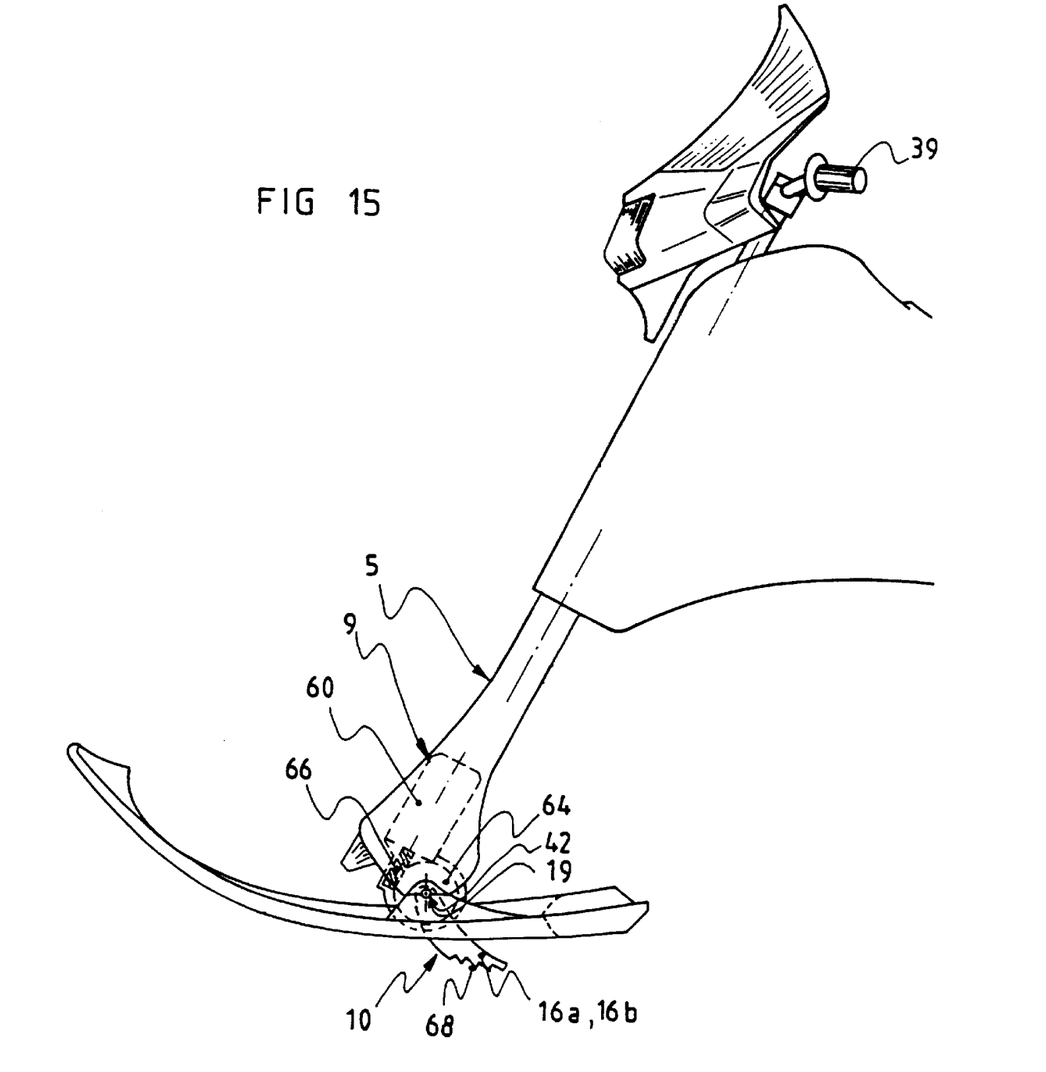
FIG. 15 shows an alternative embodiment with the control means of the braking element integrated in the steering column.
Figure 16:
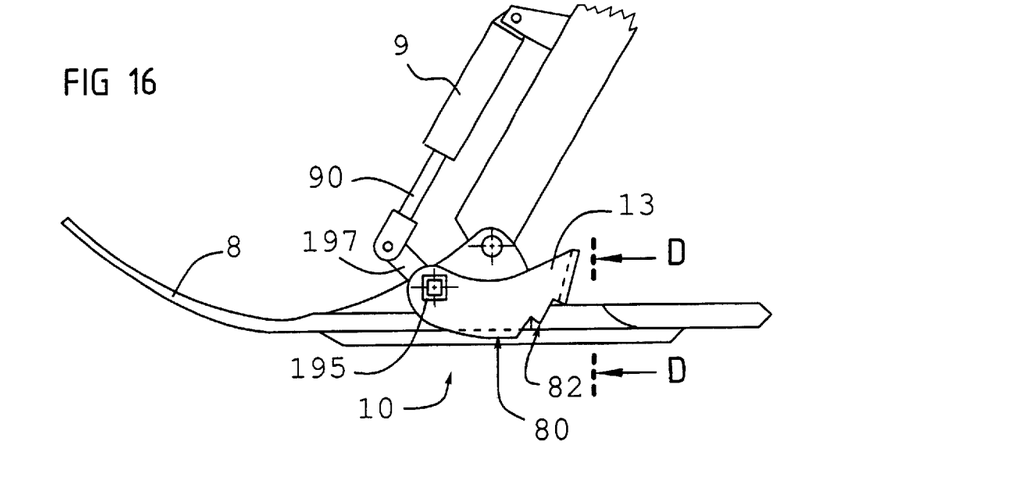
FIG. 16 shows an identical view to FIG. 15 of another alternative embodiment with the braking element also playing the role of a blade.
Figure 17:
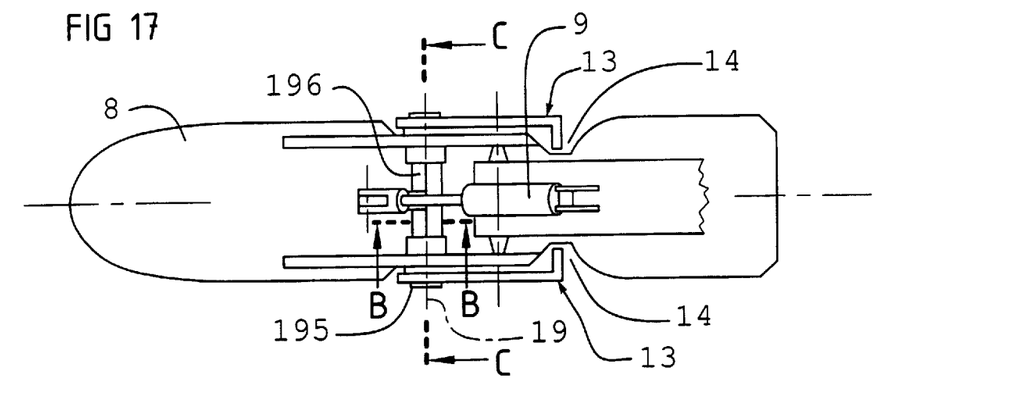
FIG. 17 is a plan view of FIG. 16.
Figure 18:
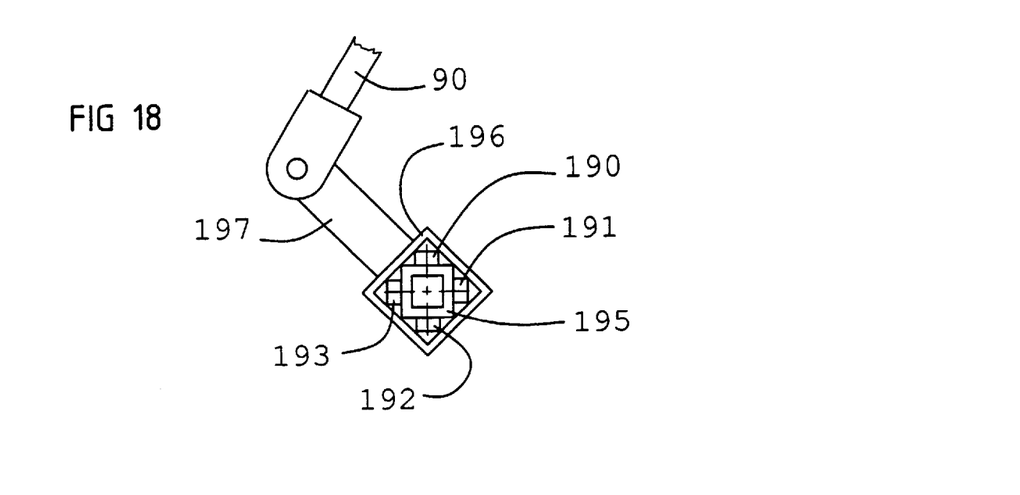
FIG. 18 is a cross-sectional view along the line 18—18 of FIG. 16.
Figure 19:
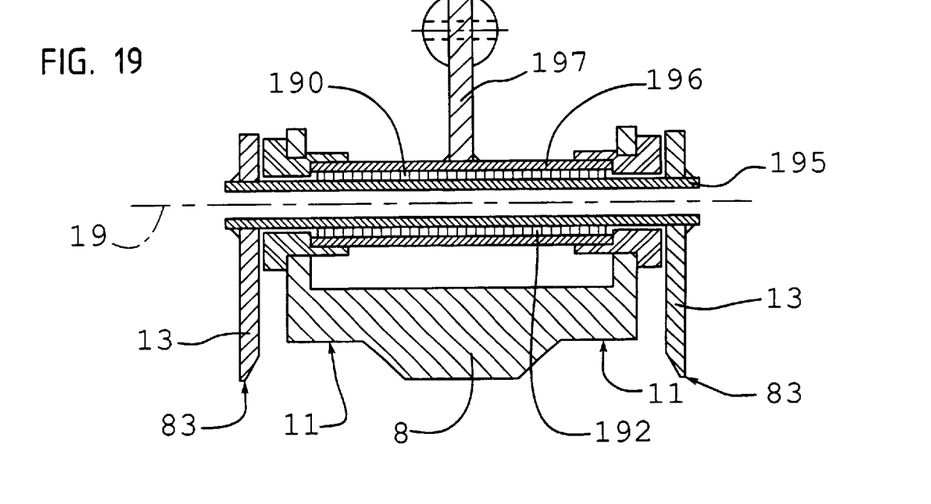
FIG. 19 represents an enlarged scale perspective view of a braking element of FIG. 16.
Figure 20:
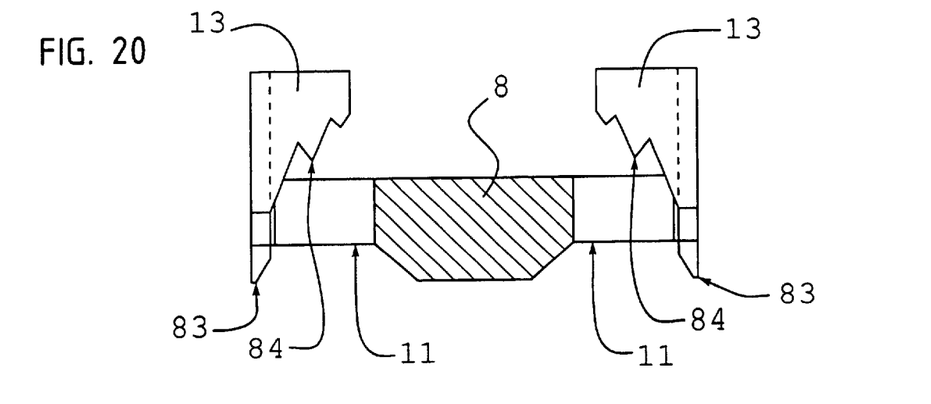
FIG. 20 is an enlarged scale cross-sectional view along the line DD of FIG. 16.
Figure 21:
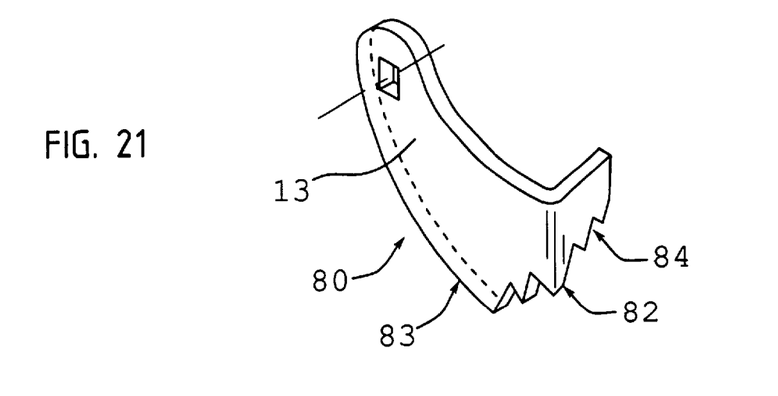
FIG. 21 represents an enlarged scale perspective view of a braking element of FIG. 16.

In FIG. 15, the rotation spindle 19 of the braking element 10 is appreciably coaxial with the articulation spindle 42 of the steering column 5. The control means 9 are integrated in the steering column 5 and comprise a drive motor device 60 operating in conjunction with transmission means 62 coupled with the braking element 10. The transmission means 62 are formed by a cog-wheel 64, or a sector of cog-wheel, actuated by an endless screw 66 extending perpendicularly with respect to the rotation spindle 19 of the braking element 10.

In the case of a vehicle with two skis on the front steering assembly, each ski is equipped with a braking element 10. A distributor device can be provided to increase the protrusion of the braking element of the inside ski with respect to that of the outside ski according to the steering angle in a bend.

On the alternative embodiment of FIGS. 16 to 19, the two lateral brake shoes 13 also serve the purpose of guide blades. The bottom edge of each shoe 13 comprises a first, toothless, front part 80 of rounded shape, and a second, notched, rear part 82. The first part 80 is provided with a sharp bottom edge 83 acting as a knife-blade penetrating into the snow. The sharp edge 83 remains protruding out with respect to the sliding surface 11 of the ski 8, even when the brake shoe 13 is in the retracted rest position. The teeth 84 are set back in the vertical direction with respect to the sharp edge 83 so as to be above the snow in the non-braking position. The presence of the sharp edges 83 of the knife-blades is particularly efficient for guiding the vehicle in bends.

The braking device can comprise actuating means controlling both the braking of device the vehicle and the braking device of a sledge drawn by said vehicle.

The bottom edge of the braking element 10 can be covered over at least a part of its length by elements having a high resistance to wear, in particular tungsten carbide.

On the alternative embodiment of FIGS. 16 to 21, the two lateral shoes 13 also serve the purpose of guide blades. The bottom edge of each shoe 13 comprises a first, toothless, front part 80 of rounded shape, and a second, notched, rear part 82. The first part 80 is provided with a sharp bottom edge 83 acting as a knife-blade penetrating into the snow. The sharp edge 83 remains protruding out with respect to the sliding surface 11 of the ski 8, even when the brake shoe 13 is in the retracted rest position. The teeth 84 are set back in the vertical direction wih respect to the sharp edge 83 so as to be above the snow in the non-braking position. The presence of the sharp edge 83 of the knife-blades is particularly efficient for guiding the vehicle in bends. On this embodiment, the brake shoes 13 are installed pivoting around the axle 19 and driven by the activator 9 through an elastic mechanism constituted by several rubber blocks 190, 191, 192, 193 compressed between the four sides of a first square tube 195 and the four angles of a second square tube 196, the first tube 195 being concentrically placed inside the second tube 196 and also concentricly with the axle 19 of the brake shoe pivot, with which it is interlocked in rotation while the second tube is interlocked in rotation with the rod 197 attached to the link 90 of the activator 9. The tube 195 can turn around the axle 19 for several degrees inside of the tube 196 against the elastic return strength produced by the rubber blocks 190, 191, 192, 193.

Thanks to this elastic mechanism, the brake-shoes 13 can pivot in the direction of non-braking, by turning round the axle 19 to retract, partially at least and momentarily when it hits a hard object like a stone or a block of ice, to come back into the brake position it was previously, once past the obstacle, and this without the driver having to use the activator 9

The braking device can comprise actuating means controlling both the braking of device the vehicle end the braking device of a sledge drawn by said vehicle.

The bottom edge of the braking element 10 can be covered over at least a part of its length by elements having a high resistance to wear, in particular tungsten carbide.

What is claimed is:

1. A braking device for a snow vehicle in particular of the snowbike type, comprising:
   a front steering assembly comprising at least one steering column secured to at least one ski, and articulated in rotation around a spindle,
   a rear support assembly, equipped with at least one driving caterpillar track,
   at least one mobile braking element associated with said front steering assembly,
   control means for operating said mobile braking element between a rest position and an active braking position protruding out under the sliding surface of the ski in a middle zone situated appreciably at the level of said spindle between the steering column and the ski, and
   an elastic mechanism that allows said braking element to retract towards said rest position when the braking element hits a hard object, and then revert to the active braking position without the driver having to use said control means.

2. The braking device according to claim 1, wherein the braking element is movable in sliding either with respect to the ski, or with respect to the steering column.

3. The braking device according to claim 2, wherein the sliding movement of the braking device is performed with respect to the ski according to an axis extending from the rear and top to the front and bottom of the ski, or according to an axis extending from the front and top to the rear and bottom of the ski.

4. The braking device according to claim 1, wherein the braking element is movable in rotation with respect to a transverse spindle extending perpendicularly with respect to the longitudinal plane of symmetry of the ski, movement of the braking element in rotation from the active position to the rest position taking place upwards.

5. The braking device according to claim 1, wherein the braking element comprises a brake shoe formed by at least one gripping blade designed to achieve a progressive braking effect according to the depth of penetration in the snow.

6. The braking device according to claim 5, wherein the brake shoe comprises two lateral notched blades appreciably parallel to the longitudinal plane of symmetry, and a transverse notched blade joining the lateral blades, the bottom edge of which transverse blade is retracted upwards with respect to the bottom edges of the lateral blades.

7. The braking device according to claim 1, comprising an actuating device comprising:
   a DC electrical power supply;
   a contact box provided with a contactor having a first closed neutral position corresponding to said rest position, a second closed position in which the polarity of the output current is reversed with respect to that of the first closed neutral position and corresponding to said active braking position, and a third open position in which the current is interrupted, situated between the previous positions, and a return means or actuating the contactor towards the first position.

8. The braking device according to claim 7, wherein the control means comprise an electrical actuator controlled by the contactor and operating in conjunction with two end-of-travel contacts enabling the power supply of the actuator to be cut off in said extreme active and rest positions.

9. The braking device according to claim 1, wherein the control means comprise a hydraulic or pneumatic jack.

10. The braking device according to claim 1, wherein the braking element is arranged in a window arranged in the ski to enable removal of snow loosened by the shoe when it is in the active position during forward movement of the vehicle.

11. The braking device according to claim 1, wherein the control means are integrated in a housing of the ski.

12. The braking device according to claim 8, wherein the rotation spindle of the braking element is coaxial with the articulation spindle of the steering column and is located forward said actuator.

13. The braking device according to claim 12, wherein the control means are securedly affixed to the steering column, and comprise a drive motor device operating in conjunction with transmission means coupled with the braking element.

14. The braking device according to claim 13, wherein the transmission means are formed by a sector of cogwheel or by a complete cogwheel actuated by an endless screw extending perpendicularly with respect to the rotation spindle of the braking element.

15. The braking device according to claim 1, wherein opening of the ignition circuit of the drive motor of the vehicle automatically causes the braking element to be moved out to its maximum active position, and closing of said ignition circuit causes the braking element to be automatically returned to the inactive non-braking position.

16. The braking device according to claim 1, applied to a vehicle with two skis on the front steering assembly, each ski being equipped with a braking element, comprising a distribution device designed to increase the protrusion of the braking element of the inside ski with respect to that of the outside ski according to the steering angle in a bend.

17. The braking device according to claim 7, wherein the control means comprise an electromagnetic actuator or an actuator actuated by an electric motor with an angular encoder in correlation with the positions of the selection lever.

18. The braking device according to claim 1, wherein the bottom edge of each braking element comprises a first front part with a sharp edge acting as a knife-blade remaining protruding out with respect to the adjacent sliding surface of the sliding sole of the ski when the brake shoe is partly retracted in the rest position, and a second notched rear part whose teeth are set back in the vertical direction with respect to the sharp edge so as to be above the snow in the non-braking position.

19. The braking device according to claim 1, comprising actuating means controlling both the braking device of the vehicle and the braking device of the sledge drawn by said vehicle.

20. The braking device according to claim 1, wherein the bottom edge of the braking element can be covered over at least a part of its length by elements having a high resistance to wear.

* * * * *